United States Patent [19]

Bochmann

[11] Patent Number: 4,850,037

[45] Date of Patent: Jul. 18, 1989

[54] METHOD AND CIRCUIT FOR RECEIVING RADIO WAVE, ESPECIALLY MULTI-ANTENNA DIVERSITY RECEPTION AND APPARATUS

[75] Inventor: Harald Bochmann, Hanover, Fed. Rep. of Germany

[73] Assignee: Blaupunkt Werke GmbH, Hildesheim, Fed. Rep. of Germany

[21] Appl. No.: 95,565

[22] Filed: Sep. 10, 1987

[30] Foreign Application Priority Data

Oct. 9, 1986 [DE] Fed. Rep. of Germany ....... 3634439

[51] Int. Cl.$^4$ ................................................ H04B 7/08
[52] U.S. Cl. .................................... 455/276; 455/137; 375/100; 343/712
[58] Field of Search ................................. 455/132–137, 455/273, 275, 277, 276, 278, 280–282, 297; 343/711, 725, 729, 712; 375/100, 101

[56] References Cited

U.S. PATENT DOCUMENTS

| | | | |
|---|---|---|---|
| 4,027,247 | 5/1977 | Aranguien | 455/137 |
| 4,347,627 | 8/1982 | Alter | 455/136 |
| 4,349,914 | 9/1982 | Evans | 455/136 |
| 4,397,036 | 8/1983 | Hirade et al. | 455/137 |
| 4,715,048 | 12/1987 | Masamuia | 455/137 |

Primary Examiner—Benedict V. Safourek
Assistant Examiner—Curtis Kuntz
Attorney, Agent, or Firm—Frishauf, Holtz, Goodman & Woodward

[57] ABSTRACT

For diversity reception from a plurality of antennas, particularly in an automotive vehicle (FIG. 4), the respectively received signals are mixed with a local oscillator signal to form a plurality of IF signals ($u_1 \ldots u_n$). The respective IF signals are weighted with a weighting coefficient which is derived from a sum circuit of all the IF signals, and the respective IF signal, which weighting circuit includes an integrator to minimize temporal variations in the amplitude of the sum signal. The sum signal forms the actual IF signal, for further processing, and demodulating to derive an audio signal. Preferably, the signals from the antennas are branched, and the branch signals phase-shifted 90°, which, again, are weighted by similarly generated weighting coefficients, and the weighted, phase-shifted signals are combined in the adding or summing circuit (70) to form said eventual IF signal for demodulation.

22 Claims, 8 Drawing Sheets

Fig. II

MATHEMATICAL RELATIONSHIPS $$u_i(t) = \hat{U}_i \cdot e^{j\xi(t)} \quad \text{with} \quad \hat{U}_i \quad \text{a real number} \qquad (1)$$

as well as $$w_i = w_{Re\ i} + jw_{Im\ i} \quad \text{with} \quad w_{Re\ i} / w_{Im\ i} \text{ are real numbers} \qquad (1a)$$

$$u_0(t) = \sum_{i=1}^{n} \hat{U}_i \cdot e^{j\xi_i(t)} \cdot w_i = |u_0(t)| \cdot e^{j\xi_0(t)} \qquad (2)$$

$$F = (|u_0(t)| - C)^2 \longrightarrow \text{Min} \qquad (3)$$

$$\left.\frac{\partial F}{\partial w_{Re\ i}}\right|_{w_{opt.}} = 0 \quad ; \quad \left.\frac{\partial F}{\partial w_{Im\ i}}\right|_{w_{opt.}} = 0 \qquad i = 1....n \qquad (4)$$

$$\dot{w}_i(t) = \int_0^t \gamma \cdot \left[ C - |u_0(\tau)| \right] \left[ \frac{u_0(\tau)}{|u_0(\tau)|} \cdot u_i(\tau) \right] d\tau \qquad (5)$$

$$C - |u_0(t)| \longrightarrow 0 \quad , \quad t > t_n \qquad (6)$$

$$w_i(t) = \int_0^t \tilde{\gamma} \cdot \left[ C - |u_0(t)| \right] \left[ \frac{u_0(\tau)}{|u_0(\tau)|} \cdot \left(\frac{u_i(\tau)}{|u_i(\tau)|}\right)^3 \right] d\tau \qquad (7)$$

METHOD AND CIRCUIT FOR RECEIVING RADIO WAVE, ESPECIALLY MULTI-ANTENNA DIVERSITY RECEPTION AND APPARATUS

The present invention relates to a method and apparatus to receive radio waves, and more particularly frequency-modulated radio waves with a plurality of antennas, especially adapted for use with automotive vehicles, in which a plurality of antennas are installed in or on the vehicle.

BACKGROUND OF THE INVENTION

Quality of reception and especially frequency-modulated (FM) radio reception in vehicles is impaired by two major sources of disturbances: (1) multi-path reception; (2) ignition noise due to neighboring vehicles, and other ambient radio noise.

The reception conditions in movable vehicles change continuously. Thus, use of directional antennae, suitable with stationary installation and there substantially improving reception quality, is not generally possible. Rather, antennas for vehicles are designed to be essentially independent of direction, that is, to have reception sensitivity which is location-independent. It has previously been proposed to use receivers with a plurality of antennas in order to improve reception. The selection of which one of the antennas to be coupled to the receiver is usually based on field strength, that is, level of the signal appearing at any one of the antennas. This selection does not necessarily, however, connect the antennas with maximum signal-to-noise level to the receiver. Optimization of signal-to-noise level in the receiver thus is not ensured.

SUMMARY OF THE INVENTION

It is an object to improve reception of radio waves, and more particularly FM reception in a vehicle, in which interference and noise signals are minimized.

Briefly, a local carrier is generated and the signals received from each of the antennae are mixed with a local carrier to provide a plurality of intermediate frequency (IF) signals. Weighting coefficients are then generated for each of the IF signals, which are based on a composite signal. The IF signals are then weighted by the weighting coefficient, for example by mixing the signals with a weighting coefficient signal, and the thus weighted IF signals are summed or added to form a sum signal. This sum signal is used twofold (1) to generate the weighting coefficient, which are obtained by minimizing the temporal variation of amplitude of the summed signal; and (2) the added, or summed signal is demodulated and applied to an audio output stage.

In accordance with a preferred feature of the invention, the mixed IF signals are connected, as such, after weighting to an adder, to carry out the adding, or summing step; additionally, the IF signals are split and rotated 90° in phase, the 90°-phase rotated signals have their own weighting coefficients applied thereto and, after weighting, they are also added in the adder to form the sum signal.

The method, and system, apparatus or circuit has the advantage that the optimizing criterion for selection is minimizing of an interference, disturbance or noise signal. The temporal amplitude variation of a disturbed, or noisy FM sum signal is minimized, so that the IF signal which would be demodulated will have a temporally constant amplitude, that is, an amplitude which is effectively constant with respect to time.

BRIEF DESCRIPTION OF THE DRAWINGS

FIG. 11 is a table of mathematical relationships.

DETAILED DESCRIPTION OF THE PREFERRED EMBODIMENT

Figure 1:
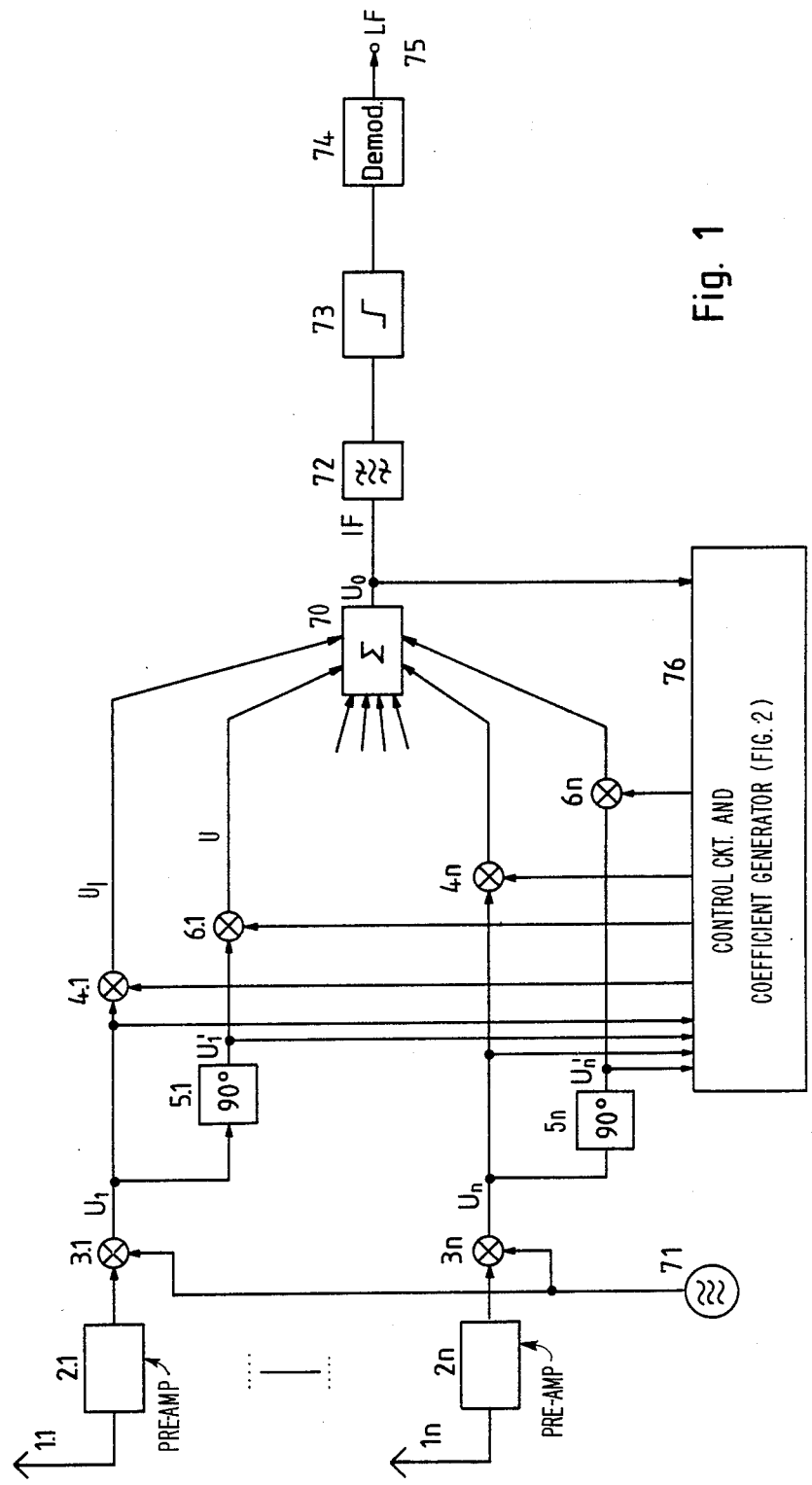
FIG. 1 is a schematic block diagram of a system in accordance with the invention, in carrying out the method.

The circuit of FIG. 1 illustrates, schematically, a plurality of antennae 1.1 to 1n. Only antenna 1.1 and antenna 1n are shown; the value of n may be any integer larger than one and, in a practical embodiment in connection with a passenger vehicle shown in FIG. 4, may be four.

Each one of he antennae is connected to a preamplifier 2.1 to 2n. The output signal from the preamplifier 2.1 . . . 2n is connected to a respective mixing stage 3.1 . . . 3n. A tunable local oscillator 71 generates a local signal which is connected to a second input of the respective mixer 3.1 . . . 3n. The resulting mixed intermediate frequency (IF) signals $u_1 \ldots u_n$ are branched. One branch, each, connects to a 90° phase shifter 5.1 . . . 5n, from which phase-shifted signals $u_{1'} \ldots u_{n'}$ are derived. Additionally, the signals from the mixer 3.1 . . . 3n are connected to one input of respective multipliers 4.1 . . . 4n. The outputs from the phase shifter 5.1 . . . 5n are connected to further multipliers 6.1 . . . 6n. The outputs from all the multipliers 4.1 . . . 4n and 6.1 . . . 6n are connected to a summing or adding circuit 70.

The sum signal $u_0$ at the output of the summing circuit 70 is coupled, as well known, to an IF amplifier stage which includes a filter 72 and a limiter 73, as well as amplification circuitry, as well known, and not further shown since it is conventional. The output from the limiter 73 is connected to a demodulator 74, the output 75 of which has low-frequency or audio signals available for further audio amplification.

In accordance with a feature of the invention, the multipliers 4.1 . . . 4n, 6.1 . . . 6n receive respective weighting coefficients, with which the IF signals $u_1 \ldots u_n$, as well as the 90° phase-shifted IF signals $u_{1'} \ldots u_{n'}$ are weighted. The coefficients applied to multipliers 4.1 . . . 4n, in a mathematical sense, are real components of a complex coefficient $\underline{w}_i$; the coefficients applied to the multipliers 6.1 . . . 6n are the imaginary components of the complex coefficient $\underline{w}_i$.

The subscript i denotes association with any one of the decimal—denoted signals or components 0.1 to n.

The voltages $\underline{u}_i(+)$ and the voltage $\underline{u}_a(+)$ can be considered complex values. They are represented by relationships (1) and (1a) of the attached table of mathematical relationships, see FIG. 11.

The sum voltage is obtained from relationships (1) and (1a) and shown in relationship (2).

The disturbance or noise to be minimized can be considered the square deviation F of the envelope $u_0(t)$ of constant level C and defined as shown in relationship (3).

When the optimum is reached, the equation (4) must be satisfied. The relationship of equation 4 is valid for deterministically defined noise or errors, as well as for the expected value of superimposed, or modulated variations which are similar to noise. If the gradient method is selected as the basis for deriving of the coefficient $\underline{w}_i(t)$, then, from equations (1) to (4), the equation (5) is obtained.

The adaptation constant $\gamma$ determines the stability and the dynamic behavior of the adaption algorithm.

When the adjustment cycle is terminated, the relationship of equation (6) will pertain.

Let us know look at equation (7) which includes the factor $$1 / |\underline{u}_i(\tau)|$$

This factor modifies the adaptation constant $\gamma$ in equation (5), then, with respect to equation (5), only dynamic behavior changes, not, however, the stationary end value.

Figure 2:
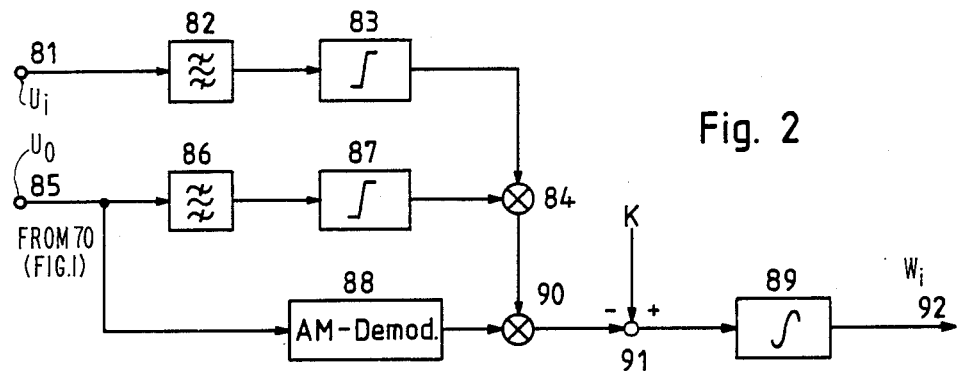
FIG. 2 is a block circuit diagram of a control circuit used to generate the coefficients and forming part of the circuit of FIG. 1.

This modification has the advantage that the simple possibility arises to carry out the adaption selectively, that is, with respect to only the transmitter being considered, without requiring a high degree of filtering, and substantial filter components. The requirements in relationship (7) of $$u_0(t)/|u_0(t)| \text{ or, respectively, } u_i(t)/|u_i(t)|$$

can be instrumented by means of limiters and amplifiers, or limiting amplifiers. The product of the first and the conjugated complex value of the second corresponds to the lower sideband of the frequency spectrum occurring upon mixing. This product depends only on the phase angle between $\underline{u}_0(t)$ and $\underline{u}_i(t)$. The function $\underline{w}_i(t)$ represented by equation (7) can easily be obtained in a control circuit and coefficient generator 76 (FIG. 1), supplying the second inputs to the respective multipliers 4.1 . . . 4n and 6.1 . . . 6n. The detailed circuit of the coefficient generator 76 is shown in FIG. 2, to which reference will now be made.

The input terminal 81 receives the respective IF signal $\underline{u}_i$; it is connected through a band-pass 82 and an amplitude limiter 83 to a first multiplier 84. A second input 85 receives the output signal $u_0$ from the summing circuit 70 (FIG. 1). The input terminal 85 is connected through a second band-pass filter 86 and a second amplitude limiter 87 to the second input of the first multiplier 84.

The output signal of the multiplier 84 is multiplied with the envelope curve derived by amplitude demodulating the signal $u_0$, derived from terminal 85 in a demodulator 88. It is multiplied in a second multiplier 90, and connected to a subtraction circuit 91. The difference with respect to an applied constant value C is formed in a subtraction circuit 91, which, in turn, is connected to an integrator 89. The output terminal 92 of the integrator 89 then will have the respective weighting coefficient $w_i$ available.

The influence on the formation of the product of the useful frequency signal portions are small if the frequency characteristics of the IF filter 82,86 are identical, even if the pass curves of the filters are less than ideal. Undesired frequency components are separated by the filters from the limiters 83,87 so that, upon mixing of their output signals, no disturbing combination frequencies may occur. Such combination frequencies are contained in the output signals of the amplitude demodulator 88 which has a wide band signal applied thereto derived from the sum signal. They do not, however, contribute to control information at the input of the integrator 89, since only the equal frequency signal portions applied to the inputs of the second multiplier 90 lead to a basic band signal.

The control circuit and coefficient generator 76 (FIG. 1) includes a plurality of circuits shown in FIG. 2, one each for the real portion of the coefficient $w_i$, for each one of the antenna channels, and a further one for the imaginary component of the coefficient $w_{i'}$. Consequently, for n antennae, 2n control circuits are needed.

Figure 2A:
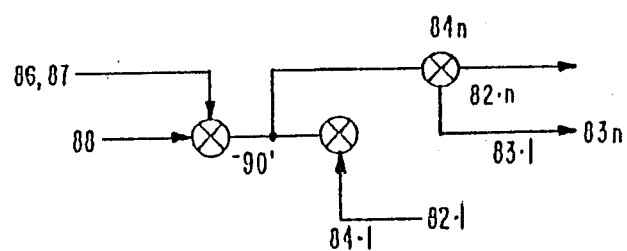
FIG. 2A is a fragmentary diagram illustrating the variation of the circuit of FIG. 2.

In accordance with a modification, shown in FIG. 2A, a common amplitude demodulator 88 and band pass 86, as well as limiter circuit 87, can be used for a plurality of circuits, by merely repositioning the respective multipliers 84,90.

Figure 3:
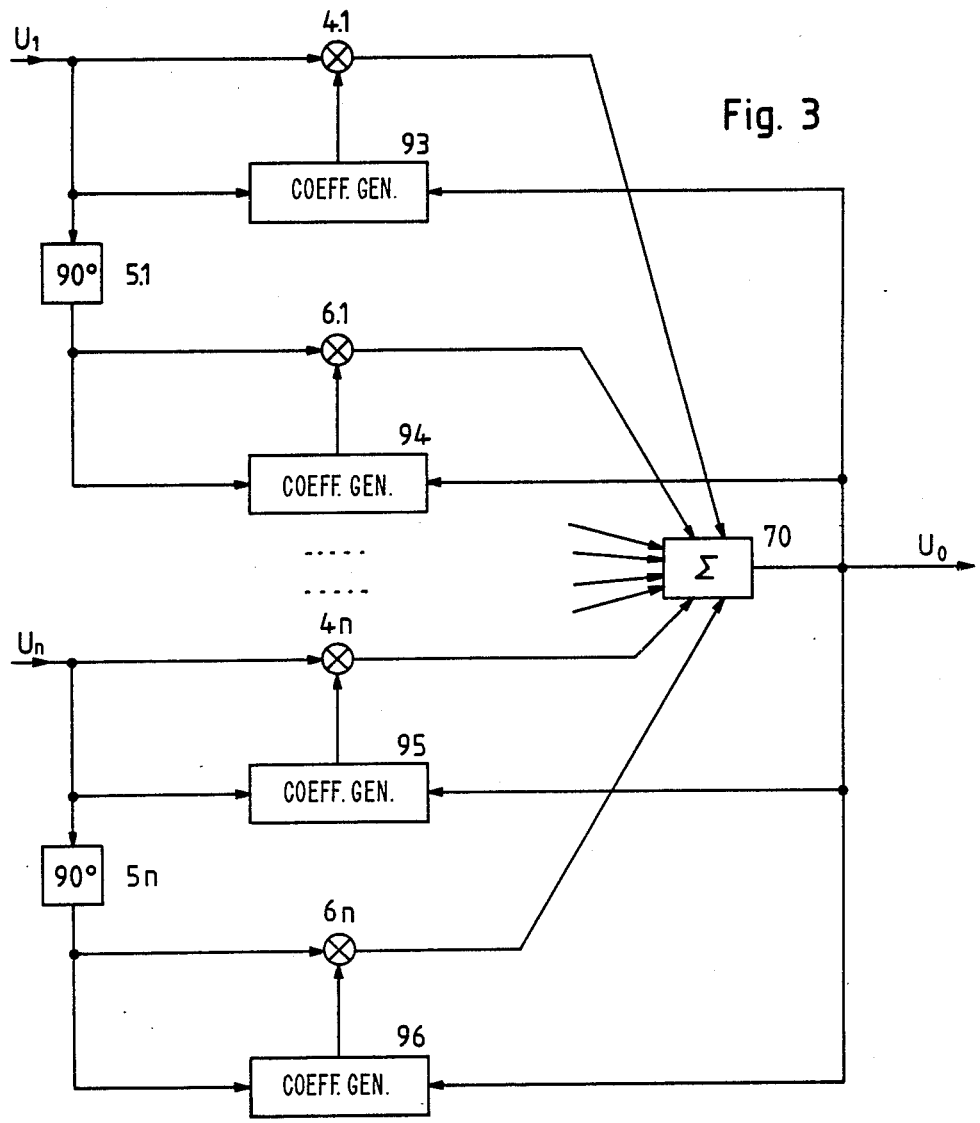
FIG. 3 is a detailed block diagram illustrating a portion of the system of FIG. 1.
Figure 4:
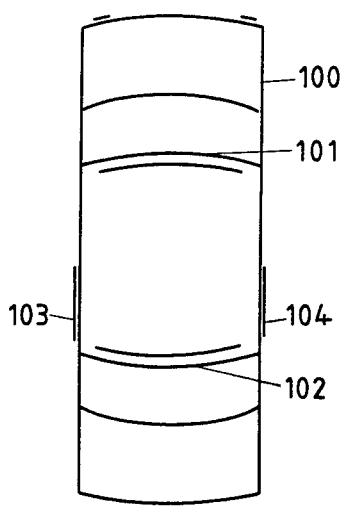
FIG. 4 is a schematic representation of a vehicle with four antennae located thereon.

FIG. 3 shows a portion of the circuit of FIG. 1, in which the controlling coefficient generator circuit 76 is shown in detail, represented by four circuits 93,94,95,96, each one, for example, being constructed as shown in FIG. 2 or FIG. 2A. A suitable placement for four antennae 101,102,103,104 on a passenger car 100 is illustrated in FIG. 4. The antennas are located, respectively, on the windshield, the rear window, and the two side windows; the spacing of the respective antennas should not be substantially less than a half wavelength of the radio band to be received; in the FM range, this corresponds to a spacing of about 1.5 m, which can easily be obtained in usual commercial passenger cars.

The effectiveness and operation of the circuit and method in accordance with the present invention will be explained in connection with FIGS. 5 to 10, in which the results were obtained by simulation.

The following data are assumed:
basic carrier frequency 100 MHz
modulation frequency: 2 kHz
frequency excursion ± 75 kHz.

The antenna system is constructed of four single antennas, located similar to the arrangement shown in FIG. 4, the spacing between two respectively opposite positioned single antennas being 1.5 m.

Figure 5:
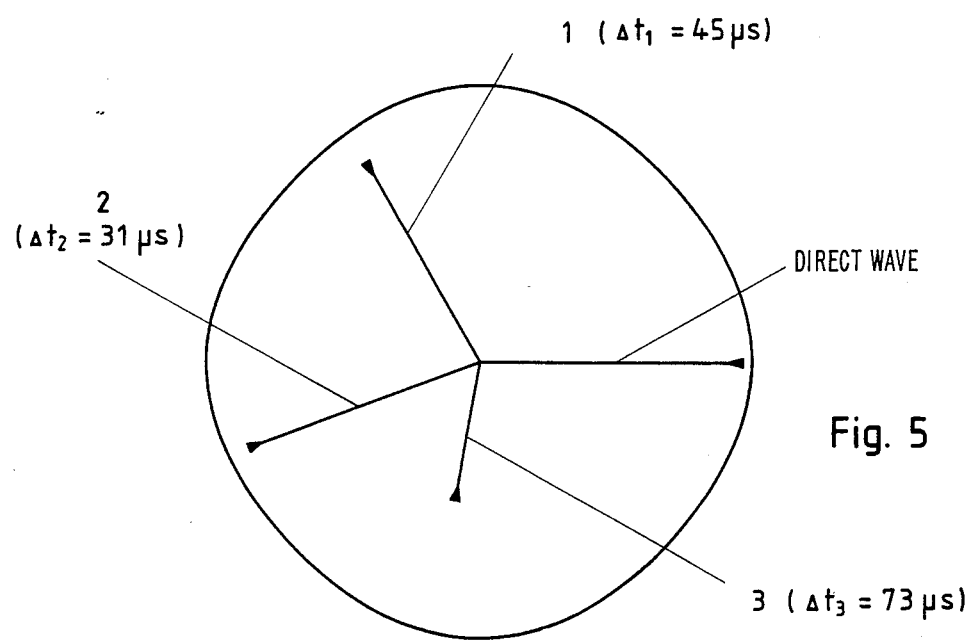
FIG. 5 is a schematic representation of an example of reception conditions.

FIG. 5 illustrates the resulting antenna direction diagram before a control or adaption cycle has been started, with fixed, randomly selected adjustment coefficients of the initial values. The straight line vectors characterize the amplitude as well as the reception direction of the direct wave and, respectively, of the echoes which are received, delayed by the delay periods $\Delta t_1$ to $\Delta t_3$, as well as the delay time value in microseconds.

Figure 6:
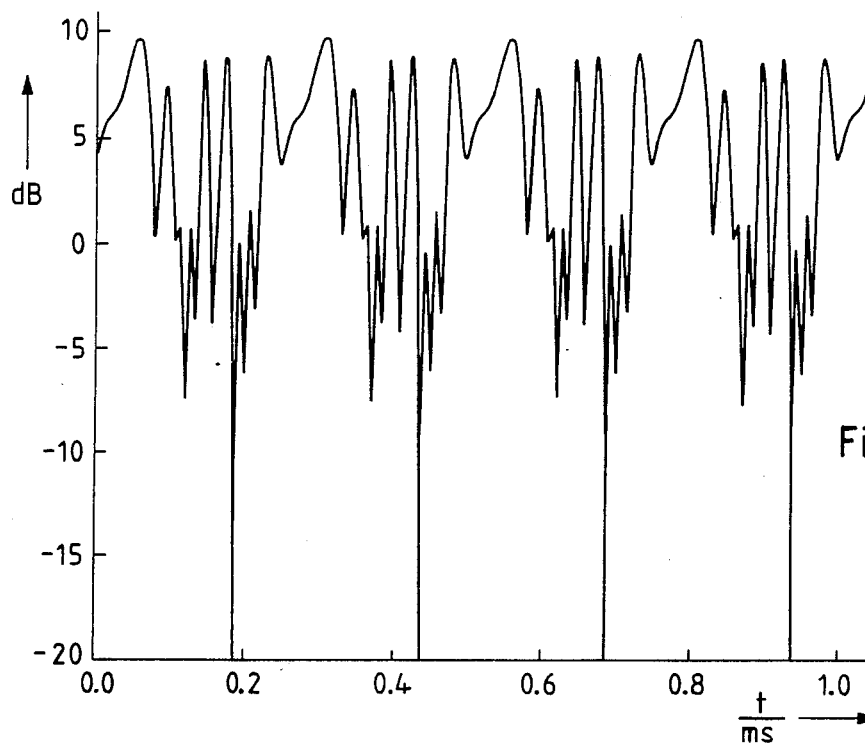
FIG. 6 is a time diagram of an IF signal without using the present invention.
Figure 7:
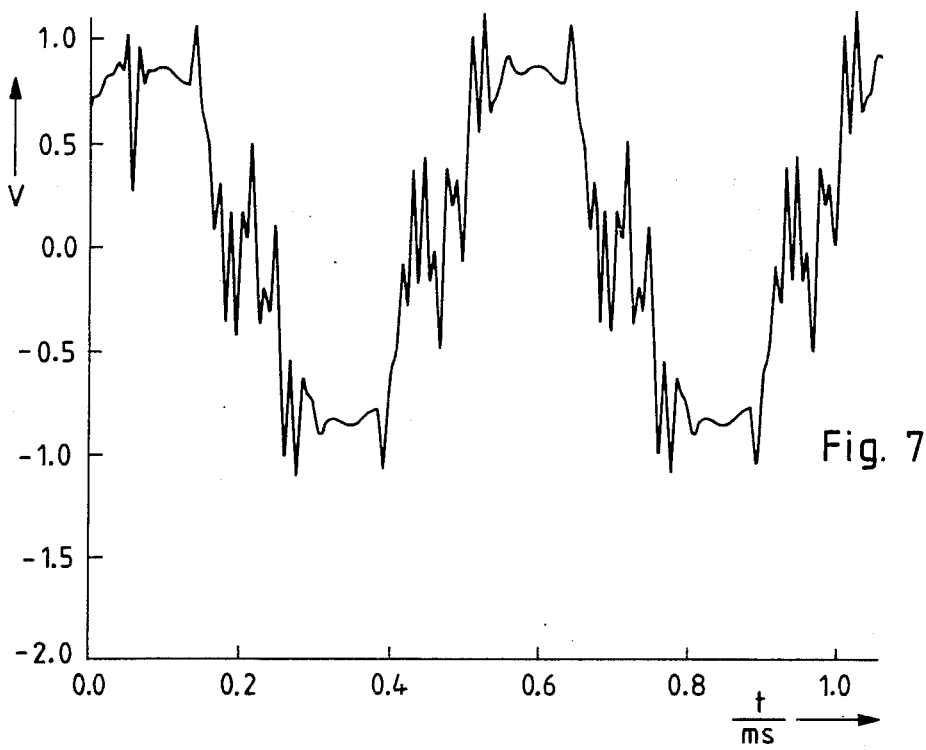
FIG. 7 is a time diagram of a demodulated signal without use of the present invention.

FIG. 6 shows the amplitude of the sum signal, that is, the IF amplitude with fixed coefficients, with respect to time, without use of control, derived from the controlling coefficient generating circuit 76. The corresponding audio signal at the output 75 of the demodulator 74 (FIG. 1) is shown, with respect to time, in FIG. 7.

Figure 8:
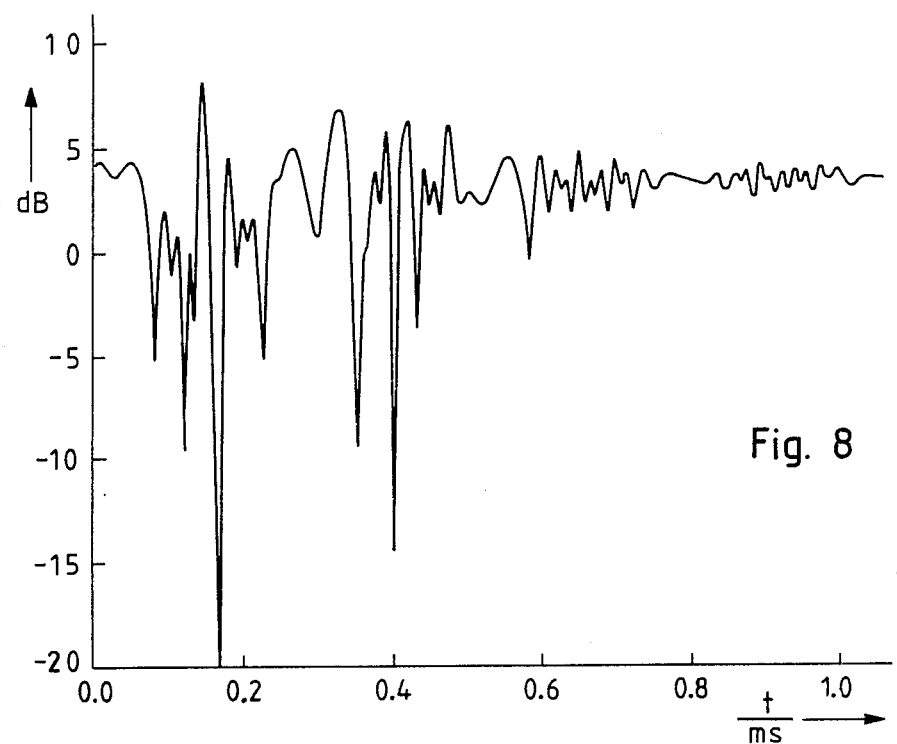
FIG. 8 is a time diagram similar to FIG. 6, and applying the present invention.
Figure 9:
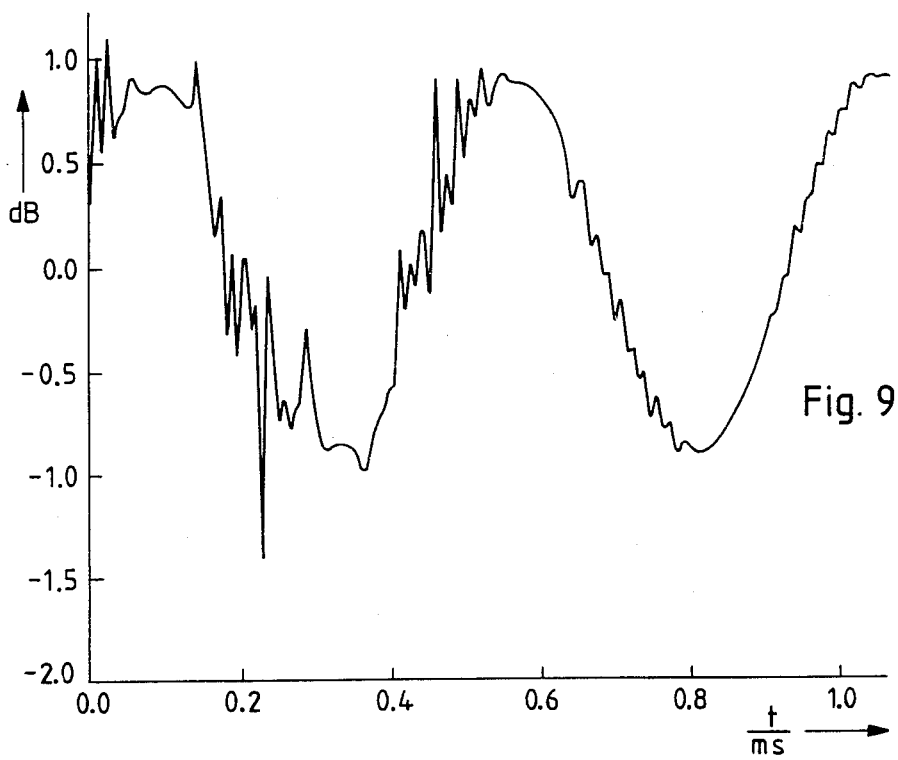
FIG. 9 is a time diagram of a demodulated signal, similar to FIG. 7, and using the present invention.

FIG. 8 shows the course of the IF amplitude after start of control by applying the weighting coefficients as described, and FIG. 9 shows the resulting audio signal and output terminal 75.

Comparison of FIGS. 6 and 8 and 7 and 9 clearly shows that the disturbances have been attenuated after less than 1 millisecond to a minor and effectively negligible rest value. This short swing-in period of the method of the present application thus makes it readily adaptable for reception in a mobile receiver, typically in an automobile receiver.

Figure 10:
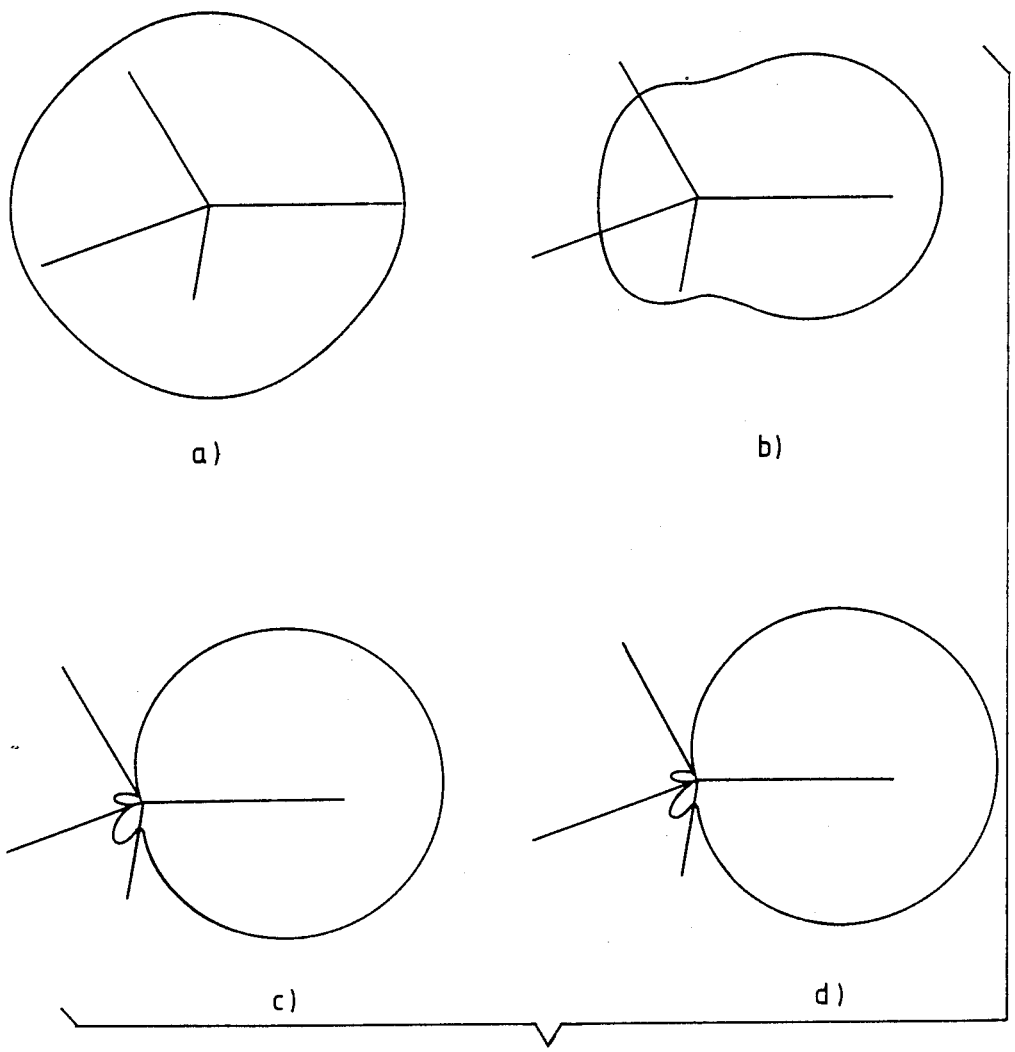
FIG. 10 illustrates four directional diagrams at selected time intervals during a single adaptation cycle.

The resulting direction diagrams of the antenna system at selected intervals during an adaptation cycle are shown in FIG. 10. These diagrams are all drawn to the same scale and, except for the time difference, represent the same system. Diagram a of FIG. 10, as can be seen, is similar to FIG. 5; at diagram d, adaption is terminated and, as can be seen, the disturbance signals formed by the echoes 1,2 and 3 (see FIG. 5) have been essentially eliminated from the signal which is applied to the audio output, and forms the sum signal. The initial, or continuing echo signals are shown in the diagrams for comparison purposes although, as can be clearly shown by the associated lobes, their influence has become practically negligible. Diagram a, thus, shows the condition before an adaption cycle has started, whereas the diagram (d) shows the result with adaption terminated.

Various changes and modifications may be made, and features described in connection with any embodiment may be used with any other, within the scope of the inventive concept.

I claim:

1. Method of receiving audio frequency-modulated radio waves with a plurality of antennas (1.1 . . . 1n), particularly antennas (101–104) mounted on a vehicle (100) comprising the steps of
    generating (in 71) a local carrier;
    mixing (in 3.1 . . . 3n) signals received from each of the antennas (1.1 . . . 1n) with the local carrier to obtain a plurality of intermediate frequency (IF) signals ($u_1 \ldots u_n$);
    generating (in 76; 93-96) a respective weighting coefficient signal ($w_1 \ldots w_i \ldots w_n$) for each of said IF signals representative of respective weighting coefficients;
    mixing (in 4.1 . . . 4n) the IF signals with the respective weighting coefficient signal to derive weighted IF signals;
    adding (in 70) the weighted IF signals to form a sum signal ($u_O$);
    demodulating said sum signal to obtain an audio output signal; and
    wherein the step of generating the respective weighting coefficient signals includes providing said weighting coefficient signals with characteristics which are representative of instantaneous phase relationship between the sum signal ($u_o$) and the respective IF signal ($u_1 \ldots u_n$) to minimize variations, with respect to time, of the amplitude of the sum signal ($u_o$).

2. The method of claim 1, wherein (FIG. 2) the step of generating the weighting coefficient signal comprises integrating, with respect to time, a signal representative of a parameter representative of the sum signal and a parameter representative of a phase angle between the sum signal and the respective intermediate frequency signal.

3. The method of claim 2, wherein the step of generating a signal representative of the phase angle between the sum signal and the respective IF signal includes band-limiting the sum signal; amplitude-limiting the band-limited sum signal; band-limiting the IF signal; amplitude limiting the IF signal; and mixing the band-limited and amplitude-limited sum and IF signal.

4. The method of claim 3, including the step of amplitude demodulating the sum signal ($u_0$) to obtain an envelope sum signal; and
    mixing the envelope sum signal with the mixed band-limited and amplitude-limited sum and IF signal.

5. The method of claim 1, further including the steps of
    branching the respective IF signals ($u_1 \ldots u_n$);
    phase-shifting the branched IF signals by 90° to derive phase-shifted IF signals ($u_{1'} \ldots u_{n'}$);
    mixing the respective phase-shifted IF signals with respective weighting coefficients;
    and adding (in 70) the weighted phase-shifted IF signals to the unbranched weighted IF signals to form said sum signal ($u_0$).

6. The method of claim 1, wherein the plurality of antennas comprise four antennas installed in an automotive vehicle.

7. The method of claim 6, wherein the antennas installed in the vehicle (101 to 104) comprise:
    a windshield antenna (101);
    a rear window antenna (102);
    and two side window antennae (103,104).

8. Radio receiver for reception of audio frequency-modulated (FM) radio waves, derived from a plurality of antennas (1.1 . . . 1n), particularly antennas (101–104) mounted on an automotive vehicle (100), comprising
    a tunable local oscillator (71);
    a plurality of mixers (3.1 . . . 3n), each coupled to a respective antenna, and to the local oscillator (71) to derive a plurality of intermediate frequency (IF) signals ($u_l \ldots u_n$);
    a plurality of first multipliers (4.1 . . . 4n) coupled to respective mixers (3.1 . . . 3n);
    a summing or adding circuit (70) coupled to receive the outputs of all the respective first multipliers (4.1 . . . 4n) to form a sum signal ($u_O$);
    filter means (72), limiter means (73) and demodulator means (74) coupled to the summing or adding circuit (70) and providing a demodulated audio output signal at an audio output terminal (75); and
    a plurality of first control and coefficient generating circuits (76; 93, 94, 95, 96), receiving, each, the sum signal ($u_O$) from said summing or adding circuit (70) and the respective intermediate frequency (IF) signal ($u_1 \ldots u_n$), the respective coefficient generating circuits generating respective weighting coefficient signals, which are representative of instantaneous phase relationship between the sum signal ($u_o$) and the respective IF signal ($u_1 \ldots u_n$) to minimize variations, with respect to time, of the amplitude of the sum signal ($u_o$),
    said weighting coefficient signals being coupled as second inputs to the respective first multipliers (4.1 . . . 4n) to multiply the weighting coefficients with the respective IF signals.

9. The circuit of claim 8, further including a plurality of phase-shifters (5.1 . . . 5n), each coupled to receive respective IF signals ($u_1 \ldots u_n$), and generating 90° phase-shifted IF signals ($u_{1'} \ldots u_{n'}$);

- a plurality of second multipliers (6.1 ... 6n), each connected to receive the respective phase-shifted IF signals ($u_{1'} \ldots u_{n'}$) and having their outputs connected to said summing and adding circuit (70) for adding or summing the respective outputs of said second multipliers and the outputs of the first multipliers (4.1 ... 4n) therein;
- and a plurality of second control and coefficient generating circuits (94, 96) connected to receive the sum signal from said summing or adding circuit (70) and the respective phase-shifted IF signal (5.1 ... 5n), and generating respective second weighting coefficient signals, said second weighting coefficient signals being coupled as second inputs to the respective second multipliers (6.1 ... 6n) to multiply the second weighting coefficients with the 90° phase-shifted IF signals ($u_{1'} \ldots u_{n'}$).

10. The circuit of claim 8, wherein each control and weighting coefficient generating circuit comprises
- a band-pass circuit (82) and amplitude limiter circuit (83) serially connected to the band-pass circuit, the band-pass circuit receiving a respective one of the IF signals ($u_1 \ldots u_n$);
- a further band-pass circuit (86) and a further amplitude limiter circuit (87) serially connected, the further band-pass circuit being connected to receive the sum signal from the summing or adder circuit (70);
- a first multiplier (84) coupled to receive the outputs of the amplitude limiter circuit (83) and the further amplitude limiter circuit (87) and providing a multiplying signal;
- an amplitude demodulator (88) coupled to receive the sum signal ($u_O$);
- an additional multiplier (90) coupled to receive the output from the amplitude demodulator (88) and said first multiplier (84);
- a subtraction circuit (91) receiving a constant subtraction value, coupled to receive the output from the further multiplier (90);
- and an integrating circuit (89) coupled to receive the output of the subtraction circuit, the output (92) of the integrating circuits forming the output of the respective control and coefficient generating circuit and being connected to the respective multiplier (4.1 ... 4n) receiving the respective IF signals for weighting the respective IF signal with the weighting coefficient represented by the output (92) of the control and coefficient generating circuit.

11. The circuit of claim 10, further including a plurality of phase-shifters (5.1 ... 5n), each coupled to receive respective IF signals ($u_1 \ldots u_1$), and generating 90° phase-shifted IF signals ($u_{1'} \ldots u_{n'}$);
- a plurality of second multipliers (6.1 ... 6n), each connected to receive the respective phase-shifted IF signals ($u_{1'} \ldots u_{n'}$) and having their outputs connected to said summing and adding circuit (70) for adding or summing the respective outputs of said second multipliers and the outputs of the first multipliers (4.1 ... 4n) therein;
- and a plurality of second control and coefficient generating circuits (94, 96) connected to receive the sum signal from said summing or adding circuit (70) and the respective phase-shifted IF signal (5.1 ... 5n), and generating respective second weighting coefficient signals, said second weighting coefficient signals being coupled as second inputs to the respective second multipliers (6.1 ... 6n) to multiply the second weighting coefficients with the 90° phase-shifted IF signals ($u_{1'} \ldots u_{n'}$);
- and wherein the respective first and second control and coefficient generating circuits for each of the respective intermediate frequency signals ($u_1 \ldots u_n$) and phase-shifted intermediate frequency signals ($u_{1'} \ldots u_{n'}$) are effectively identical.

12. The circuit of claim 10, wherein the amplitude demodulator (88), the band-pass circuit (86) coupled to the summing circuit, and the amplitude limiter circuit (87) coupled to the respective band-pass circuit (87) comprises a common circuit for a plurality of control and coefficient generating circuits.

13. The circuit of claim 11, wherein the amplitude demodulator (88), the band-pass circuit (86) coupled to the summing circuit, and the amplitude limiter circuit (87) coupled to the respective band-pass circuit (87) comprises a common circuit for a plurality of control and coefficient generating circuits.

14. The circuit of claim 8, wherein the plurality of antennae comprise four antennae installed in an automotive vehicle.

15. The circuit of claim 14, wherein the antennas installed in a vehicle (101 to 104) comprise, respectively:
- a windshield antenna (101);
- a rear window antenna (102);
- and two side window antennas (103,104).

16. The circuit of claim 11, wherein the plurality of antennae comprise four antennas installed in an automotive vehicle.

17. The circuit of claim 16, wherein the antennae installed in a vehicle (101 to 104) comprise, respectively:
- a windshield antenna (101);
- a rear window antenna (102);
- and two side window antennas (103,104).

18. Method of receiving audio frequency-modulated radio waves with plurality of antennas (1.1 ... 1n), particularly antennas (101–104) mounted on a vehicle (100) comprising the steps of
- generating (in 71) a local carrier; mixing (in 3.1 ... 3n) signals received from each of the antennas (1.1 ... 1n) with the local carrier to obtain a plurality of intermediate frequency (IF) signals ($u_1 \ldots u_n$);
- mixing (in 4.1 ... 4n) the IF signal with respective weighting coefficient signals to derive weighted IF signals;
- adding (in 70) the weighted IF signals to form a sum signal ($u_O$);
- demodulating said sum signal to obtain an audio output signal; and
- generating weighting coefficient signals ($w_1 \ldots w_i \ldots w_n$) for each of said IF signals as a function of the instantaneous phase relationship between the temporal variations of the amplitude of the sum signal ($u_o$) and the respective IF signal ($u_1 \ldots u_n$) to provide said weighting coefficient signals for said mixing step.

19. The method of claim 18, wherein said step of generating said weighting coefficient signals ($w_1 \ldots w_i \ldots w_n$) comprises providing said weighting coefficient signals with characteristics which are representative of instantaneous phase relationship between the sum signal ($u_o$) and the respective IF signal ($u_1 \ldots u_n$) by mixing the sum signal ($u_o$) with the respective IF signals ($u_1 \ldots u_n$) and a signal representative of the envelope of the sum signal ($u_o$).

20. The method of claim 19, further including the steps of branching the respective IF signals ($u_1 \ldots u_n$);

phase-shifting the branched IF signals by 90° to derive phase-shifted IF signals ($u_{1'} \ldots u_{n'}$);

mixing the respective phase-shifted IF signals with respective weighting coefficients;

and adding (in 70) the weighted phase-shifted IF signals to be unbranched weighted IF signals to form said sum signal ($u_0$).

21. The method of claim 19, wherein the weighting coefficient generating step includes the step of filtering the IF signals ($u_1 \ldots u_n$) and mixing respective filtered IF signals with the sum signal ($u_o$) to obtain the signals representative of the relative phase position of the respective IF signals and the instantaneous amplitude variation of the sum signal.

22. The method of claim 1, wherein the weighting coefficient generating step includes the step of filtering the IF signals ($u_1 \ldots u_n$) and mixing respective filtered IF signals with the sum signal ($u_o$) to obtain the signals representative of the relative phase position of the respective IF signals and the instantaneous amplitude variation of the sum signal.

* * * * *